United States Patent
Huff

[15] 3,699,645
[45] Oct. 24, 1972

[54] METHOD OF MAKING APPARATUS FOR SENSING TEMPERATURE

[72] Inventor: Ronald G. Huff, North Olmsted, Ohio

[73] Assignee: The United States of America as represented by the Administrator of the National Aeronautics and Space Administration

[22] Filed: May 26, 1971

[21] Appl. No.: 147,099

Related U.S. Application Data

[62] Division of Ser. No. 877,717, Nov. 18, 1969, Pat. No. 3,671,329.

[52] U.S. Cl. ..................29/573, 29/624, 136/233
[51] Int. Cl. .....B01j 17/00, H01l 15/00, H01n 49/00
[58] Field of Search............29/157 R, 624, 628, 573; 136/230, 233

[56] References Cited

UNITED STATES PATENTS

| 3,435,520 | 4/1969 | Copeland | 29/628 |
| 3,462,317 | 8/1969 | Baum et al | 136/230 |
| 3,488,839 | 1/1970 | Proxmire | 29/628 X |
| 3,553,827 | 1/1971 | Baker et al | 29/628 X |

*Primary Examiner*—John F. Campbell
*Assistant Examiner*—Richard Bernard Lazarus
*Attorney*—N. T. Musial, G. E. Shook and J. R. Manning

[57] ABSTRACT

Measuring the surface temperature of a wall heated by a flowing fluid without disturbing the boundary layer. A thin electrical conductor forming a thermocouple junction is covered by a layer of protective material to guide the flow of fluid over the junction.

10 Claims, 3 Drawing Figures

PATENTED OCT 24 1972    3,699,645

INVENTOR
RONALD G. HUFF

BY Norman T. Musial
Gene E. Shook

ATTORNEYS

3,699,645

METHOD OF MAKING APPARATUS FOR SENSING TEMPERATURE

STATEMENT OF COPENDENCY

This application is a division of application Ser. No. 877,717 which was filed Nov. 18, 1969, now U.S. Pat. No. 3,671,329.

STATEMENT OF GOVERNMENT OWNERSHIP

The invention described herein was made by an employee of the United States Government and may be manufactured and used by or for the Government for governmental purposes without the payment of any royalties thereon or therefor.

BACKGROUND OF THE INVENTION

This invention relates to the measurement of wall temperatures in regeneratively cooled rocket engines having thin walled cooling passages. The invention is particularly concerned with making an improved thermocouple device for sensing the temperature on the hot side of a thin-walled cooling passage.

As rocketry advances there is a need for better heat transfer information. A problem encountered in obtaining such information in regeneratively cooled engines has been in the measuring of the hot-gas-side wall temperatures. It is this temperature which plays a very important part in determining the burn out condition in a regeneratively cooled rocket engine, and its measurement is vital in correlating data used to design high pressure-heat flux engines.

One of the reasons why this measurement is so difficult is that the thickness of the cooling tubes is about 0.01 inch. It has been proposed that thermocouples be attached directly to the surfaces of these tubes. Thermal conduction and the disturbance of the fluid stream change the temperatures at the thermocouples.

Optical pyrometers are used in other studies where the surfaces can be seen. However, the radiation from the burning fluid obscures the surface of the rocket engine, and the use of such pyrometers is not practical.

SUMMARY OF THE INVENTION

These problems have been solved in a system constructed in accordance with the invention. A very fine wire having a quartz jacket with an outside diameter of less than 0.003 inch is used as one leg of a thermocouple. This wire is bent to the contour of a curved wall. A portion of the jacket is removed from one end to provide a small length of exposed wire which is then attached to the surface of the wall. A cover layer is formed by electroplating a layer of metal over the wire to protect the junction from hot gases. The wall temperature is determined by reading the voltage generated by the thermocouple junction formed by the wire and the material from which the wall is fabricated.

OBJECTS OF THE INVENTION

It is, therefore, an object of the present invention to make a thermocouple which can measure wall temperatures without disturbing an adjacent boundary layer.

Another object of the invention is to provide a method of making a thermocouple junction on the hot side of a wall having hot gases flowing over the surface.

A further object of the invention is to provide a method of making an improved thermocouple device utilizing a single conductor and junction which minimizes conduction to give a more accurate temperature reading.

These and other objects and advantages of the invention will be apparent from the specification which follows and from the drawings wherein like numerals are used throughout to identify like parts.

DESCRIPTION OF THE PREFERRED EMBODIMENT

Figure 1:
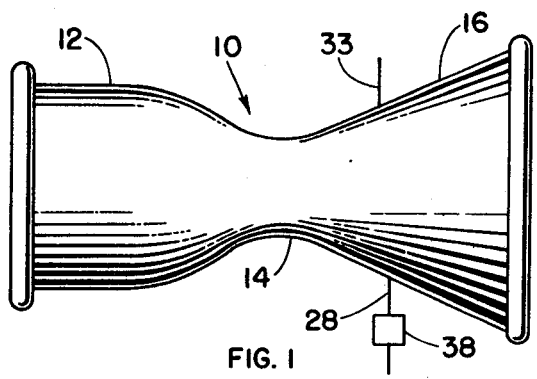
FIG. 1 is a front elevational view of a rocket engine having thermocouples mounted in accordance with the invention.

Referring now to the drawings a typical rocket engine 10 in the form of an annular hollow elongated enclosure is shown in FIG. 1. The rocket engine 10 includes an upstream cylindrical combustion chamber 12, an adjacent downstream convergent-divergent throat section 14, and an exhaust nozzle 16. Hot gases from the combustion chamber 12 pass through the throat section 14 to the nozzle 16 in a manner well known in the art.

Figure 2:
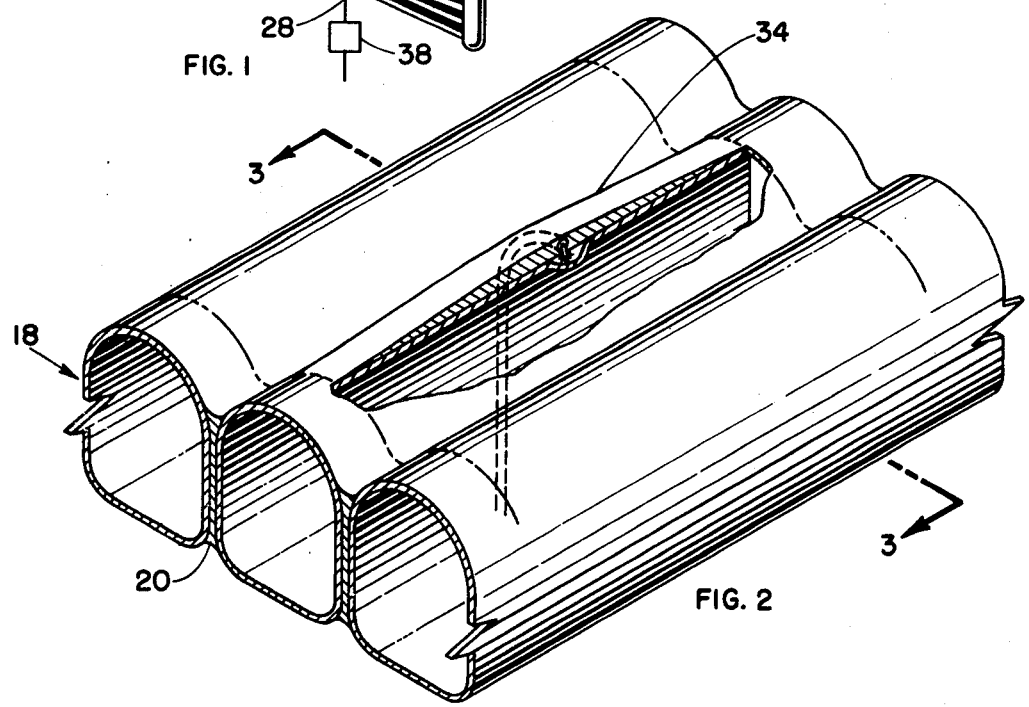
FIG. 2 is an enlarged perspective view of a portion of the regeneratively cooled rocket engine shown in FIG. 1.

The enclosure that forms the casing for the rocket engine 10 is formed by a number of contiguous tubes 18 connected together by brazing material 20 or the like as shown in FIG. 2. A fluid flows through the tubes 18 to regeneratively cool the rocket engine 10 in a conventional manner. Stainless steel tubes 18 having thin walls on the order of 0.01 inch in thickness are utilized in high heat flux engines. With such thin tubes knowledge of the true temperature on the hot-gas-side wall inside the engine 10 is extremely important for proper design.

These temperatures are obtained by thermocouples 22, 24 and 26 that are constructed in accordance with the present invention. The thermocouples are mounted on the side of the tubes 18 adjacent the hot gases flowing from the combustion chamber 12 to the nozzle 16. Although the invention is shown and described with respect to its application to regeneratively cooled rocket engines, it may be employed to any type of thin wall where accurate temperature measurement is required.

According to the invention one leg of each thermocouple 22, 24 and 26 is formed by an electrical conductor 28 covered with insulation 30. In the preferred embodiment the insulation 30 is in the form of a quartz covering about a small wire 28. The outside diameter of the wire including the quartz insulator is less than 0.003 inch. The wire 28 has a diameter less than 0.001 inch. These small dimensions may be achieved by hot drawing the wire and the quartz simultaneously.

Figure 3:
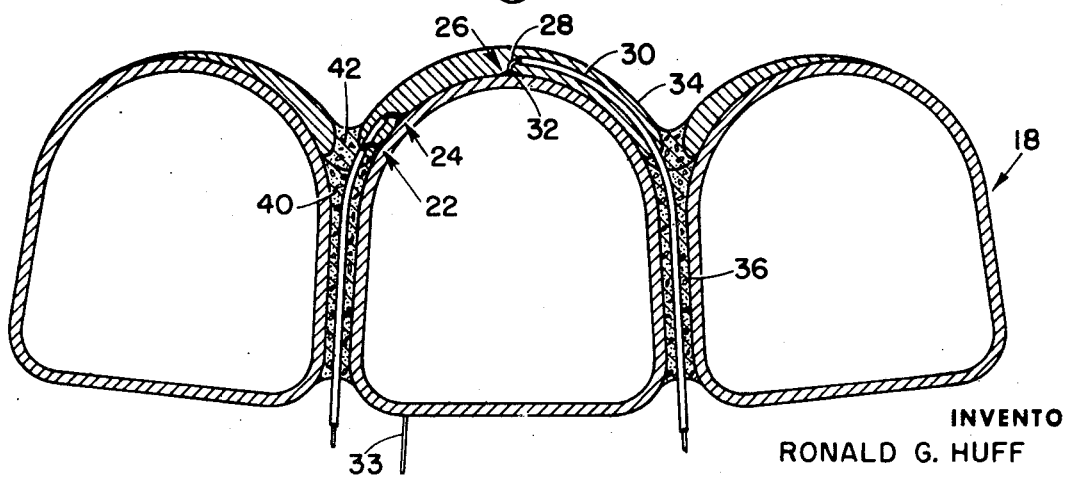
FIG. 3 is an enlarged sectional view taken along the line 3-3 in FIG. 2.

A portion of the insulating material 30 is removed from the end of the wire 28 as shown in FIG. 3. The exposed end of the wire 28 is spot welded at 32 to the outer wall of the coolant passage 18. The insulated wire 28 and spot welded end 32 are then covered by a metal layer 34 as will be explained later in detail.

A thermocouple junction comprising two secondary junctions is formed. One junction exists at the point where the wire 28 enters the quartz 30. The other junction is located at a point on the metal layer - wall interface adjacent the first junction.

The stainless steel wall forms the other leg of each thermocouple. A lead wire 33 is attached to the outwardly facing wall of the tube 18 as shown in FIGS. 1 and 3. It will be appreciated that the spot welding of the wire 28 to the tube 18 merely facilitates assembly in this embodiment.

The layer of metal 34 forms a protective covering over the wire and junction. The metal layer 34 is electroplated on the surfaces of the tubes 18 adjacent the thermocouples 22, 24 and 26. The metal 34 is any material which may be electroplated, such as copper or nickel. The plating thickness is on the order of 0.005 to 0.009 inch.

An important feature of the invention is that the marginal peripheral edges of the plated metal 34 are faired as shown in FIGS. 2 and 3. This eliminates disturbances to the boundary layer between the hot flowing gases and the wall.

Each of the thermocouples 22, 24 and 26 is constructed in the manner previously described. Referring to FIG. 3 thermocouple 26 is provided at the crest of the tube 18. Thermocouple 24 is provided at a point which is 45° from the crest. Thermocouple 22 is mounted at the braze line of the tube 18.

Providing thermocouples of such fine diameter wire creates certain manufacturing problems. These have been overcome by the installation procedures of the present invention. The area where the junction 32 is to be provided is thoroughly cleaned prior to attaching the thermocouple. This cleaning may be accomplished by filing. The area which is to be covered by the electroplated metal 34 shown in FIG. 2 is then masked by painting the surrounding area with acid resistant paint.

An insulated wire is bent to the desired diameter to fit the tube 18. This is accomplished by directing a torch into the end of a ceramic tube having the same diameter as the rocket cooling tube 18. The ceramic tube is heated to about 2,365° F. The quartz jacketed wire is laid on the tube and gently bent to the desired shape.

The end portion of the quartz jacket is removed from the wire after bending by etching with hydrofluoric acid. The quartz also may be removed by cracking the end portion and sliding the quartz from the wire.

An access hole 36 is provided between the engine cooling tubes 18 during the engine brazing process by placing stop off material between the tubes. The stop off is removed after the brazing has been completed. In an alternate process lengths of quartz tubing are inserted between the tubes 18 before brazing and removed by etching with hydrofluoric acid after brazing.

The performed quartz insulated thermocouple wire 28 is passed through the access hole from inside the engine 10. The wire 28 is positioned with the aid of an optical assembly. The end portion of the wire is then spot welded to the cooling tube 18. A capacitance-discharge type welder has been satisfactory for this purpose.

Weights 38 are attached to the wire to hold the preformed thermocouple close to the cooling tube 18 during planting. If the quartz insulator moves away from the surface of the tube 18, the metal 34 will not cover the thermocouple assembly. Also the quartz insulator 30 may be covered at the crest and locked in place while the remainder of the quartz is allowed to move. This would result in breakage of the quartz and would allow the plated metal to short the thermocouple causing a secondary junction.

What is claimed is:

1. A method of making a thermocouple on the hot side of a wall having hot gases flowing thereover comprising the steps of
    cleaning the surface of the wall where the thermocouple is to be located,
    masking a portion of the wall around the cleaned surface,
    bending a wire having an insulating cover to the contour of the wall surface,
    removing the insulating cover from an extreme outermost end portion of said wire,
    securing the exposed end of the wire to the cleaned surface of the wall, and
    electroplating a layer of metal over said covered wire in the unmasked portion of the wall.

2. A method of making a thermocouple as claimed in claim 1 including the step of hot drawing the wire and insulating material simultaneously prior to bending to the contour of the wall surface.

3. A method of making a thermocouple as claimed in claim 2 including the step of hot drawing the wire and insulating material to an outside diameter of less than about 0.003 inch.

4. A method of making a thermocouple as claimed in claim 3 including the step of hot drawing the wire to a diameter of less than about 0.001 inch.

5. A method of making a thermocouple as claimed in claim 3 including the step of hot drawing quartz insulating material.

6. A method of making a thermocouple as claimed in claim 1 including the step of spot welding the exposed end of the wire to the cleaned surface of the wall.

7. A method of making a thermocouple as claimed in claim 1 including the step of electroplating a layer of metal over the covered wire in the unmasked portion of the wall to a thickness from about 0.005 inch to about 0.009 inch.

8. A method of making a thermocouple as claimed in claim 7 including the step of electroplating a layer of metal selected from the group consisting of copper and nickel.

9. A method of making a thermocouple as claimed in claim 7 including the step of fairing the marginal peripheral edges of the layer of plated metal.

10. A method of making a thermocouple as claimed in claim 1 including the step of bending the wire having an insulated cover over a heated ceramic tube having the contour of the wall surface.

* * * * *